United States Patent [19]

McBride

[11] 3,752,431

[45] Aug. 14, 1973

[54] APPARATUS FOR MOUNTING A TRANSDUCER TO THE TRANSOM OF A BOAT

[75] Inventor: William E. McBride, Tulsa, Okla.

[73] Assignee: Lowrance Electronics Mfg. Corp., Tulsa, Okla.

[22] Filed: Sept. 10, 1971

[21] Appl. No.: 179,425

[52] U.S. Cl.................................. 248/291, 340/8 S
[51] Int. Cl............................................. H04r 1/44
[58] Field of Search....................... 248/291, 293, 4, 248/284, 286, 292, 294; 340/8 S

[56] References Cited
UNITED STATES PATENTS

| | | |
|---|---|---|
| 3,521,225 | 7/1970 | Kursman et al. ................ 340/8 S |
| 2,757,888 | 8/1956 | Branstrator ............................ 248/4 |
| 3,362,290 | 1/1968 | Carr et al. ........................... 285/3 X |
| 2,646,950 | 7/1953 | Nelson et al. ......................... 248/1 |

*Primary Examiner*—J. Franklin Foss
*Attorney*—Head & Johnson

[57] ABSTRACT

This invention relates to apparatus for elevational control of a sonic transducer from the transom of a vessel. The configuration comprises means for mounting a sonic transducer upon a transom of a vessel in order to gain elevational control of the azimuth of the sonic transducer in relation to the water line and further provides a means for protecting the sonic transducer and apparatus from damage by impact with objects during use.

2 Claims, 5 Drawing Figures

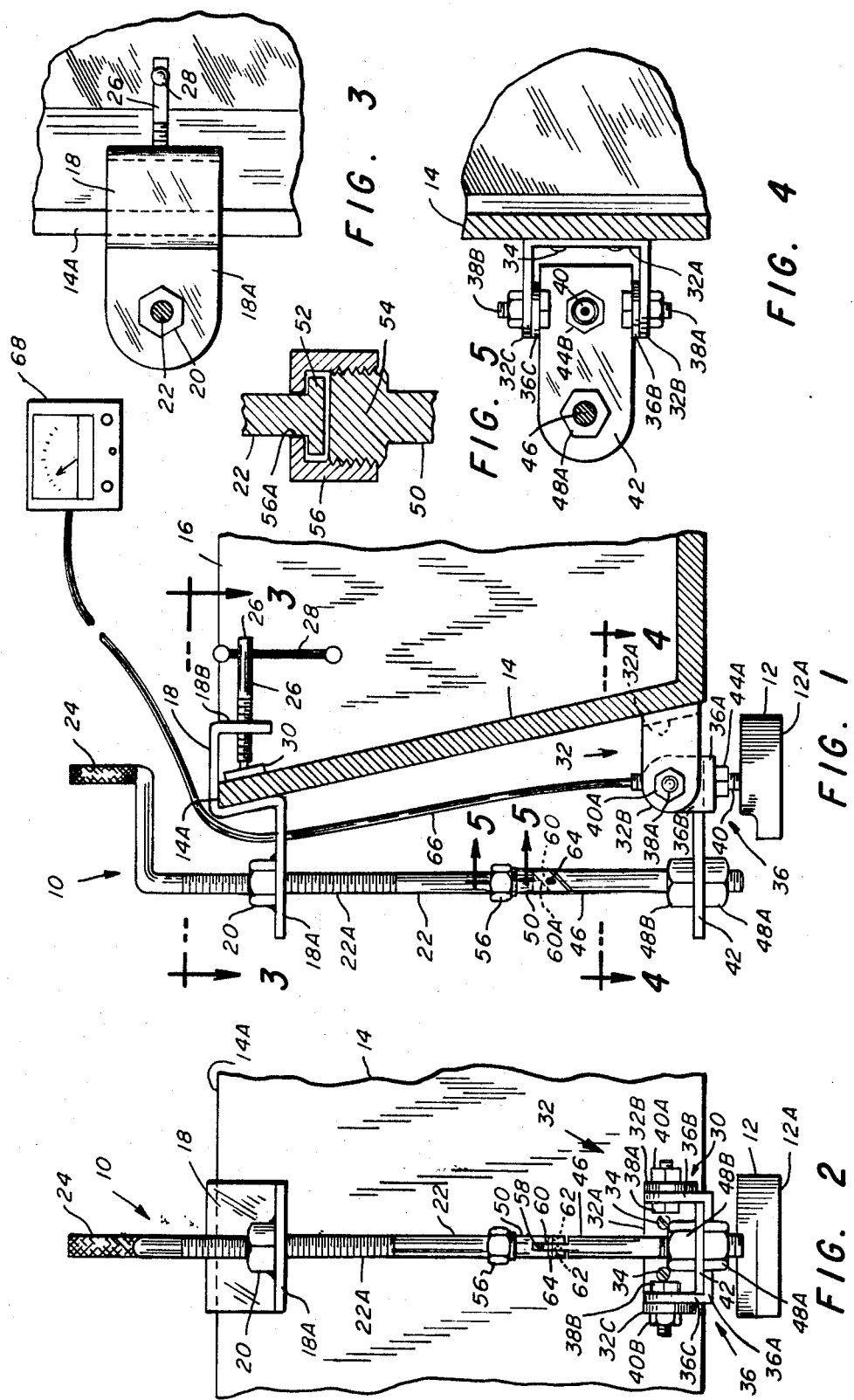

APPARATUS FOR MOUNTING A TRANSDUCER TO THE TRANSOM OF A BOAT

SUMMARY

Sonar equipment has found many commercial uses, for example, utilization of sonic echo ranging devices for the location of fish or for indicating the depth of water. The sonar equipment employs an electro-acoustic transducer or sonic transducer for transmitting sound energy and for receiving echoes from objects in the field under investigation. It is desirable that the transducer be securely mounted upon the transom of the boat in order that it provide a secure installation and a rugged assembly, thereby yielding minimum backlash or play regardless of the relatively high forces to which the transducer assembly is subjected as the boat moves through the water. U.S. Pat. No. 2,837,727 is an example of one design of a transducer mounting arrangement.

The above referred to United States patent is representative of the state of the art in mountings for underwater sound apparatus. One difficulty with the apparatus of the design embodiment in that patent, which is typical of the problems encountered with other known mounts, is that the mount is rigidly affixed to the transom of the boat and is neither easily removable or adjustable so as to be capable of retaining the sonic transducer in position when a new azimuth orientation is required, and does not provide a means for protecting the mounting apparatus and sonic transducer from impact with objects in the water.

This invention provides an easily mounted and easily removable apparatus for azimuth orientation of a sonic transducer from the transom of a vessel having a configuration such that the sonic transducer is provided with means for preventing damage to the transducer or the mount if an object in the water is struck. The apparatus provides for azimuth adjustments for a sonic transducer as the vessel on which it is mounted progresses at various velocities to gain optimum transmitting and receiving signals.

OBJECTS OF THE INVENTION

It is an object of this invention to provide an improved apparatus for mounting a sonic transducer to a boat.

Another object of this invention is to provide an apparatus for mounting a sonic transducer to the transom of a boat including improved means of accurate azimuth orientation of the transducer.

Another object of this invention is to provide an apparatus for mounting a sonic transducer to the transom of a boat including means of preventing the apparatus and the transducer from being damaged when an object in the water is struck.

These as well as other objects will be fulfilled by the apparatus to now be described, taken in conjunction with the attached drawings.

DESCRIPTION OF THE VIEWS

FIG. 1 is a side view of one embodiment of the apparatus of the present invention as mounted on the transom of a boat for supporting and orienting a transducer.

FIG. 2 is a rear view of the apparatus mounted on the transom of a boat.

FIG. 3 is a cross-sectional view taken along line 3—3 of FIG. 1.

FIG. 4 is a cross-sectional view taken along line 4—4 of FIG. 1.

FIG. 5 is a cross-sectional view taken along the line 5—5 of FIG. 1.

DETAILED DESCRIPTION

Referring now to the drawings and first to FIGS. 1 and 2, the apparatus of this invention is indicated generally by the numeral 10. The apparatus 10 serves to mount and orient a sonic transducer 12 to the transom 14 of a boat 16. The apparatus includes a mounting bracket 18 configured to fit the upper end 14A of transom 14. Bracket 18 includes a rearwardly extending horizontal portion 18A having an opening (not shown) therein. (See also FIG. 3). Fixed to the horizontal portion 18A is an internally threaded nut 20 having a threaded opening. The threaded opening in nut 20 is in alignment with the opening in the mounting bracket horizontal portion 18A.

A vertical adjusting rod 22, having external threads 22A on a portion thereof, is threadedly received in nut 20. The adjusting rod is bent at the upper end thereof to form a crank arm 24 by which the adjusting rod 22 is manually rotated. It can be seen that turning crank arm 24 causes the adjusting rod 22 to be axially displaced relative to mounting bracket 18.

Mounting bracket 18 includes a forward vertical portion 18B having a threaded opening (not shown) receiving an externally threaded attaching rod 26. The attaching rod 26 has a handle 28 at the outer end by which it may be manually rotated. Pivotally mounted to the inner end of attaching rod 26 is a contact plate 30 which engages the interior of a boat transom 14. The attaching rod 26, handle 28, and contact plate 30 serves as a means of removably affixing mounting bracket 18 to the upper end of boat transom 14. It can be seen that many other ways may be utilized for removably attaching a mounting bracket 18. In addition, if it is not desired that the bracket be easily removable the horizontal portion 18A may be permanently fixed to the rearward surface of the transom bracket 14, such as by means of screws.

Mounted on the exterior lower end of transom 14, below mounting bracket 18, is a transducer bracket, generally indicated by the numeral 32. Bracket 32 is U-shaped, having an intermediate portion 32A, which is attached to the transom such as by means of screws 34, and opposed parallel horizontally extending portions 32B and 32C. Pivotally received between portions 32B and 32C is a U-shaped pivot bracket, generally indicated by numeral 36, having a horizontal intermediate portion 36A and opposed upwardly extending paralleled winged portions 36B and 36C. The width between the wing portion 36B and 36C is substantially equal to and less than the interior width between the transducer bracket wing portions 32B and 32C. Each of the wing portions 32B, 32C, 36B, and 36C has an aligned opening therein (the openings not being shown) which receive bolts 38A and 38B. Nuts 40A and 40B respectively hold the bolts in position in a manner wherein bracket 36 is free to pivot relative to bracket 32 around the axis formed by bolts 38A and 38B.

The transducer 16 includes an upwardly extending tubular shank portion 40 which is externally threaded.

Positioned on the upper surface of pivot bracket intermediate portion 36A, and extending generally horizontally and rearwardly, is a pivot arm 42 (see FIG. 4). The pivot arm 42 and the intermediate portion 36A of the pivot bracket have an aligned opening therein (not shown) which receives transducer shank 40. Nuts 44A and 44B on shank 40 secure the transducer 12 to pivot bracket 36 and simultaneously secures the pivot arm 42 to the pivot bracket so that the transducer is oriented in the azimuth direction by the pivotation of arm 42 about bolts 38A and 38B.

Fixed to the outer end of pivot arm 42 is a connecting rod 46. The pivot arm 42 has an opening therein (not shown) receiving the threaded lower end of the connecting rod 46. Nuts 48A and 48B secure the lower end of the connecting rod to the pivot arm 42.

Rotatably affixed to the lower end of adjusting rod 22 is a linkage rod 50, best illustrated in FIG. 5. The lower end of adjusting rod 22 includes enlarged diameter portion 52. The upper end of the linkage rod 50 includes an enlarged diameter externally threaded portion 54. An internally threaded nut 56, having an opening 56A therein is received on the adjusting rod 22 and encompasses the enlarged portion 52 and threadably engages the linking rod threaded portion 54. Thus, adjusting rod 52 may be rotated relative to linking rod 50, but the axial displacement of the adjusting rod is transmitted to the linking rod 50. This is one example of many different arrangements which may be utilized for rotationally coupling adjusting rod 22 to linkage rod 50.

The lower end of linking rod 50 is affixed to the upper end of connecting rod 46 in a manner so that the rods are rotationally and axially interrelated but in a way in which they may be broken away from each other in the event transducer 12 is struck by an object in the water. The lower end of linkage rod 50 has a slot 58 therein. The upper end of connecting rod 46 has an integral flat portion 60 slidably received in slot 58. An aligned hole 62 extends through the lower end of linkage rod 50 having a slot 58 therein, and the flat portion 60 of connecting rod 46. Positioned in opening 62 is a shear pin 64 so that connecting rod 50 is normally axially coupled to the connecting rod 46. As shown in FIG. 1, the upper end 60A of the connecting rod flat portion 60 is slanted downwardly away from transom 14. In this way pivot arm 42 and connecting rod 46 are free to pivot towards transom 14 when shear pin 64 is severed, such as by an object striking transducer 12.

Extending from transducer 12 through the tubular shank 40 is a conductor 66 leading to a sonar instrument 68. The instrument 68 may be a meter, rotating disc, or any other type of device to indicate the presence of and distance of objects in the water and the depth of the water in which boat 16 is positioned.

OPERATION

In the operation of a sonar apparatus sound is transmitted in pulses, and the echoes received and amplified. Receipt of an echo is the indication of the presence of an object which may be, such as a fish, located between the transducer and the bottom of the body of water in which the boat 16 is being utilized, or it may indicate the bottom of the body of water. The time lapse between the transmission of a sound pulse and the echo is an indication of the distance between the transducer and the object producing the echo.

In order to accurately indicate the depth of objects, it is important that the transducer be oriented in a way such that the sound pulses travel in the proper direction. For instance, if boat 16 is standing still, or very slowly moving, it is desired that the transducer 12 be oriented such that the transducer face 12A be horizontal to insure that the propagation of sound pulses will travel directly vertically and that vertical reflections be received. The angle of the transom on different boats vary. Mounting bracket 10 provides a device to easily achieve the right orientation of a transducer 12 for different boats. By rotation of handle 24 adjusting rod 22, linkage rod 50, and connecting rod 46 are all axially displaced to pivot arm 42 and thereby transducer 12 for proper azimuth orientation.

When a sonar depth indicating apparatus is used for a rapidly moving boat, particularly in deeper water, the direct vertical propagation of sound downwardly will frequently result in the boat being completely out of the beam of reflected sonic energy by the time the sonic wave travels downwardly and is reflected from the bottom. Therefore, in order to obtain an indication of the depth of water in a rapidly moving boat, the sonic energy must be beamed slightly forward in the direction of the movement of the boat. By the apparatus of this invention, the azimuth orientation transducer 12 may be adjusted to provide the best sonar reading for various speeds and water depths.

In addition, as boats vary in speed, the angle of the boat transom relative to the vertical varies. By this invention the orientation of the transducer may be adjusted to correct for such variation.

If an object in the water, such as a submerged log or the like, strikes the transducer 12 as boat 16 is moving, force is exerted on shear pin 64, causing it to sever. This permits the transducer 12, pivot arm 42, and connecting rod 46 to all pivot forward. This raises the transducer to pass over the object struck without destroying the transducer or the mounting bracket.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed:

1. An apparatus for mounting and angularly positioning a transducer to the transom of a boat comprising:
   a pivot bracket having the transducer supported thereon;
   a transducer bracket affixed to the lower portion of the boat transom, the pivot bracket being pivotally affixed to the transducer bracket;
   a pivot arm extending from the pivot bracket;
   a mounting bracket affixed to the upper portion of the boat transom;
   a generally vertical threaded adjusting rod rotatably and threadably supported to said mounting bracket; and
   means coupling the lower end of said adjusting rod to said pivot arm whereby threadably axially positioning said adjusting rod pivots said pivot arm and thereby said transducer.

2. An apparatus for mounting a transducer to the transom of a boat according to claim 2 including:
   wherein said means coupling the lower end of said adjusting rod to said pivot arm includes shear pin means.

* * * * *